United States Patent [19]

Demers

[11] Patent Number: 5,456,302

[45] Date of Patent: Oct. 10, 1995

[54] PROCESS AND APPARATUS FOR SEATING TUBELESS TIRES

[76] Inventor: Norman P. Demers, P.O. Box 4010, Manchester, N.H. 03108-4010

[21] Appl. No.: 263,791

[22] Filed: Jun. 22, 1994

[51] Int. Cl.$^6$ .................................................. B60C 25/00
[52] U.S. Cl. .................................................. 157/1; 157/1.1
[58] Field of Search .................................................. 157/1, 1.1, 1.2; 222/3, 631

[56] References Cited

U.S. PATENT DOCUMENTS

| | | | |
|---|---|---|---|
| 5,042,547 | 8/1991 | Van De Sype | 157/1.1 |
| 5,072,764 | 10/1991 | Ochoa | 157/1.1 |

Primary Examiner—James G. Smith
Attorney, Agent, or Firm—William B. Ritchie

[57] ABSTRACT

A method and apparatus for bead seating a tubeless tire onto a rim. Two separate reservoirs are provided with an inflation reservoir being at a slightly lower pressure than a charging reservoir. Both reservoirs are filled at the same time via a pressure differential valve. A push button causes the pressure to change slightly in the charging reservoir. A quick release valve, sensing the slight pressure change, substantially instantaneously releases the air in the charging reservoir. The release of air permits a piston to slide thus substantially instantaneously releasing the air in the inflation reservoir which is channeled to a nozzle which seats the bead of the tire on the rim.

8 Claims, 6 Drawing Sheets

PROCESS AND APPARATUS FOR SEATING TUBELESS TIRES

BACKGROUND OF THE INVENTION

1. Field of the Invention

The invention relates to a method for bead seating a tubeless tire onto a rim and an apparatus for the same.

2. Description of the Related Art

While tubeless tires provide significant advantages over the tube-type, it is extremely difficult to seat the bead of the tire on the rim. This difficulty creates a special problem when trying to change a tire on the road, far from the customary equipment used to seat the tire.

One solution to the problem had been the introduction of ether inside the tire which was then ignited. The resulting explosion often was sufficient to seat the tire. Of course, determining the precise amount of ether necessary to seat the tire without potential injury to the operator was next to impossible. Therefore, this method was quickly abandoned.

A class of such tools, which are best described as mechanical, although they may include some pneumatic elements, rely on the use of flexible straps or segmented hoops which squeeze along the circumference of the tire and thereby force the bead upward toward the bead seating surface. These mechanical devices are not conducive to being portable and require a substantial amount of time in the preparation of the equipment prior to the inflation process. Also, the more difficult truck tires to seat could not be seated with such devices.

Another class of such tools, which are best described as pneumatic, although they employ some non-pneumatic elements, utilize a source of compressed air to impart momentum to the bead and inject air into the tire, thereby initiating a progressive bead seating process. While these devices are an improvement over the above-described methods and apparatus, the use of a valve to release a stored supply of compressed air adversely affects the rise time of the pulse of air, thereby limiting the effectiveness of the device.

U.S. Pat. No. 3,866,654, issued to Duquesne, discloses a device for inflating tubeless tires that utilizes a single source of compressed air which directly supplies an injection nozzle and a valve for controlling the air flow. The Duequesne device requires the tire to be inflated in a fixed location, where the supply of compressed air is located. This apparatus cannot be used to seat the bead of tubeless tire on the road. Also, the distance from compressor to injection nozzle is relatively long and the use of a mechanical valve located in the path effects the energy of the compressed air that is used in the bead seating process.

U.S. Pat. No. 5,072,764, issued to Ochoa, discloses a bead seating apparatus that utilizes a hand operated valve, preferably a ball-type valve to release a charge of air from a storage tank. The valve is located in a conduit which is in the path that the charge of air must travel to the tire. Since it takes time for the ball valve to be moved from the fully closed to the fully opened position, the rise time of the pulse of air is substantially retarded, thus reducing the effectiveness of the apparatus. Also, this device features a nozzle that is fashioned from the conduit which introduces additional resistance into the system.

An improvement on the Ochoa device is a bead seating apparatus manufactured by the Bead Seater Corporation. This device features a tank, a ball-type valve and a conduit as disclosed by Ochoa. However, the Bead Seater apparatus provides a fan-shaped nozzle having a radius that is dimensioned to correspond to the rim of the tire. While the nozzle improves performance over the Ochoa device, this device is still limited by the use of the ball-type valve and the conduit.

A portable bead seating apparatus that eliminates the need for a conduit with valve thus producing a pulse of air having a substantially faster pressure rise time is not found in the prior art.

SUMMARY OF THE INVENTION

It is an object of the invention to provide a bead seating apparatus that has the least restrictive passage-way for the air charge stored within a tank to proceed to the tire that is to be seated.

It is another object of the invention to provide a bead seating apparatus that can be activated without using a ball-type valve or gate valve within a conduit.

It is another object of the invention to provide a bead seating apparatus that is adaptable to a wide range of truck tire sizes and manufacturers, including those having the most difficult tire beads to seat.

It is still another object of the invention to provide a bead seating apparatus which is portable and is easily stowable.

Another object of the invention is to provide a bead seating apparatus that can be manufactured from readily available parts.

Finally, it is an object of the invention to provide a bead seating apparatus that can be activated by a push button so that the operator can hold the device firmly with both hands.

The invention is an apparatus for seating the bead of a tubeless tire on rim. An inflating reservoir for containing a first charge of air having a predetermined volume and pressure is provided. Said inflating reservoir has an inlet and outlet. A charging reservoir for containing a second charge of air having a predetermined volume and pressure is provided. Said charging reservoir has a charging port, a releasing inlet and an outlet. The volume of said charging reservoir is much less than the volume of said inflation reservoir. A pressure differential valve is disposed between the inlet of said inflating reservoir and the charging port of said charging reservoir, wherein a charge of compressed air introduced into said pressure differential valve causes both said charging reservoir and said inflating reservoir to be substantially simultaneously filled. The pressure in said charging reservoir is at least slightly greater than the pressure in said inflating reservoir. Depressurizing means for slightly reducing the pressure within said charging reservoir is provided. Said depressurizing means is connected to said pressure differential valve. Sealing means, separating the outlet of said inflation reservoir from the releasing inlet of said charging reservoir, is provided for releasably holding the charge of air in said inflation reservoir. Quick release means, connected to said charging reservoir, is provided for substantially instantaneously releasing the charge of air within said charging reservoir when a slight reduction in the pressure within said charging reservoir is detected. A nozzle having an inlet and an outlet, with the inlet of said nozzle connected to the outlet of said charging reservoir is provided; wherein upon release of the charge of air within said charging reservoir, said sealing means substantially instantaneously releases the charge of air in said inflation reservoir through the outlet of said inflation reservoir into the inflation inlet of said charging reservoir and out the outlet of said charging reservoir and into the inlet of said nozzle, wherein said nozzle delivers the charge that had been stored in said inflation reservoir as a single pneumatic pulse of air between the bead of the tire and the rim to seat the bead of the tire on the rim.

DETAILED DESCRIPTION OF THE INVENTION

Figure 1:
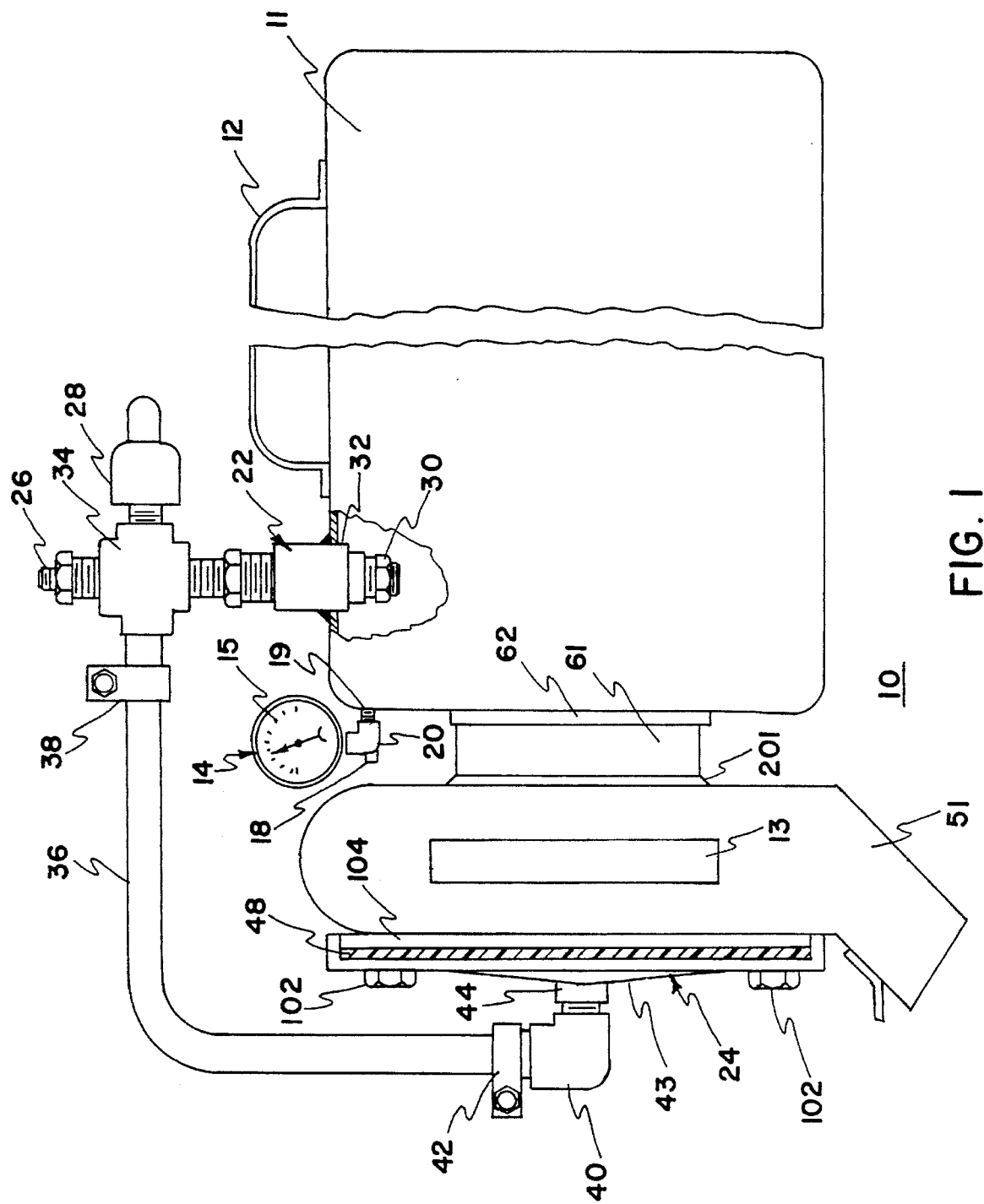
FIG. 1 is a partial cut-away side view of the apparatus for seating the bead of a tubeless tire in accordance with the invention.

FIG. 1 is a partial cut-away side view of invention 10. An inflating reservoir 11 is preferably a pressure vessel having a capacity of at least 1500 cubic inches and a capability of storing air at pressures of at least 125 lb/in. While ASME approved tanks should be used wherever possible, non-rated tanks which meet the specifications provided herein are also acceptable for use as inflating reservoir 11. The actual size and pressure rating of inflating reservoir 11 will vary according to the size of the tire to be sealed and to the pressure of the air stored therein. Invention 10 is easily maneuvered and transported by handle 12 attached to the exterior of inflating reservoir 11. Another handle 13 optionally may be attached to charging reservoir 24.

Attached to inflating reservoir 11 is relief assembly 14, including a pressure gauge 15 which is provided to display the internal air pressure of inflating reservoir 11. Pressure relief valve 18, preferably rated 150 psi, is provided to prevent over-inflation and to release the excess pressure within inflating reservoir 11. Relief assembly 14 is connected to inlet 19 through Tee fitting 20.

Compressed air inlet assembly 22, is preferably attached at the top of inflating reservoir 11, forward of handle 12. Assembly 22 inflates both inflating reservoir 11 and charging reservoir 24. Invention 10 is filled by attaching it to a source (not shown) capable of delivering a pressure of approximately 90 to 150 psi. The source should not deliver a higher pressure than the lowest pressure rating of an element in invention 10.

Compressed air inlet assembly 22 includes pneumatic coupling 26 of the type commonly used in the general purpose pneumatic hose. Assembly 22 also contains push button 28, such as Tramec #3500, which when depressed will initiate the seating process of the tire. Pressure differential valve 30 is connected to compressed air inlet assembly 22. A typical pressure differential valve which is suitable for use as valve 30 is a Kingston #128A. Valve 30 provides for a predetermined pressure difference between the inflation reservoir 11 and charging reservoir 24 with the pressure within charging reservoir 24 being at least slightly greater than inflation reservoir 11. The preferred difference is approximately 10%. Noted that the volume of reservoir 24 is a small fraction of the volume of reservoir 11. Components associated with compressed air inlet 22 are connected to inlet 32 through fitting 34, for example, ¼ NPT brass cross.

Tubing 36 is connected to fitting 34. Tubing 36 is preferably made of schedule 40, ⅜" O.D. copper tubing which is connected to fitting 34 through an appropriately sized coupling 38. Any materials capable of withstanding the pressures indicated are acceptable. The other end of tubing 36 is connected to quick release valve 40, such as Midland model number M2090559EA. Coupling 42 is utilized to connect the tubing 36 and the quick release valve 40.

Quick release valve 40 is attached to charging head plate 43 through coupling 44, preferably a ⅜" spud. Charging head plate 43 is preferably constructed of 0.125"++/− 0.010 steel. As shown, charging plate 43 is preferably slightly symmetrically convex about location of coupling 44 to provide additional strength characteristics. Charging head plate 43 has the ends folded at an approximately 90 degree angle, so as to enclose rubber diaphragm 48 and chassis 104 of charging reservoir 24. The enclosed tolerance is not essential but improves the appearance of invention 10 and adds to the strength. Charging plate 43 is attached with eight 5/16" 24 T.P.I. bolts 102.

A flexible rubber diaphragm 48 is located adjacent to and with approximately same cross sectional area as the charging head plate 43. Rubber diaphragm 48 is preferably model TRAMEC 53009. Charging reservoir 24 is connected to nozzle 51. While reservoir 24 and nozzle 51 are preferably fabricated separately from sheet steel, either welded or bolted together, it is also possible that the main components of these subassemblies could be fabricated as a single unit. Flange 104 is connected between rubber diaphragm 48 and nozzle 51. Spud 62 is welded to an opening in reservoir 11. Nipple 61 is then threaded to spud 62. Nozzle 51 is welded to the outlet of reservoir 11 via nipple 61 to complete the apparatus.

Figure 2:
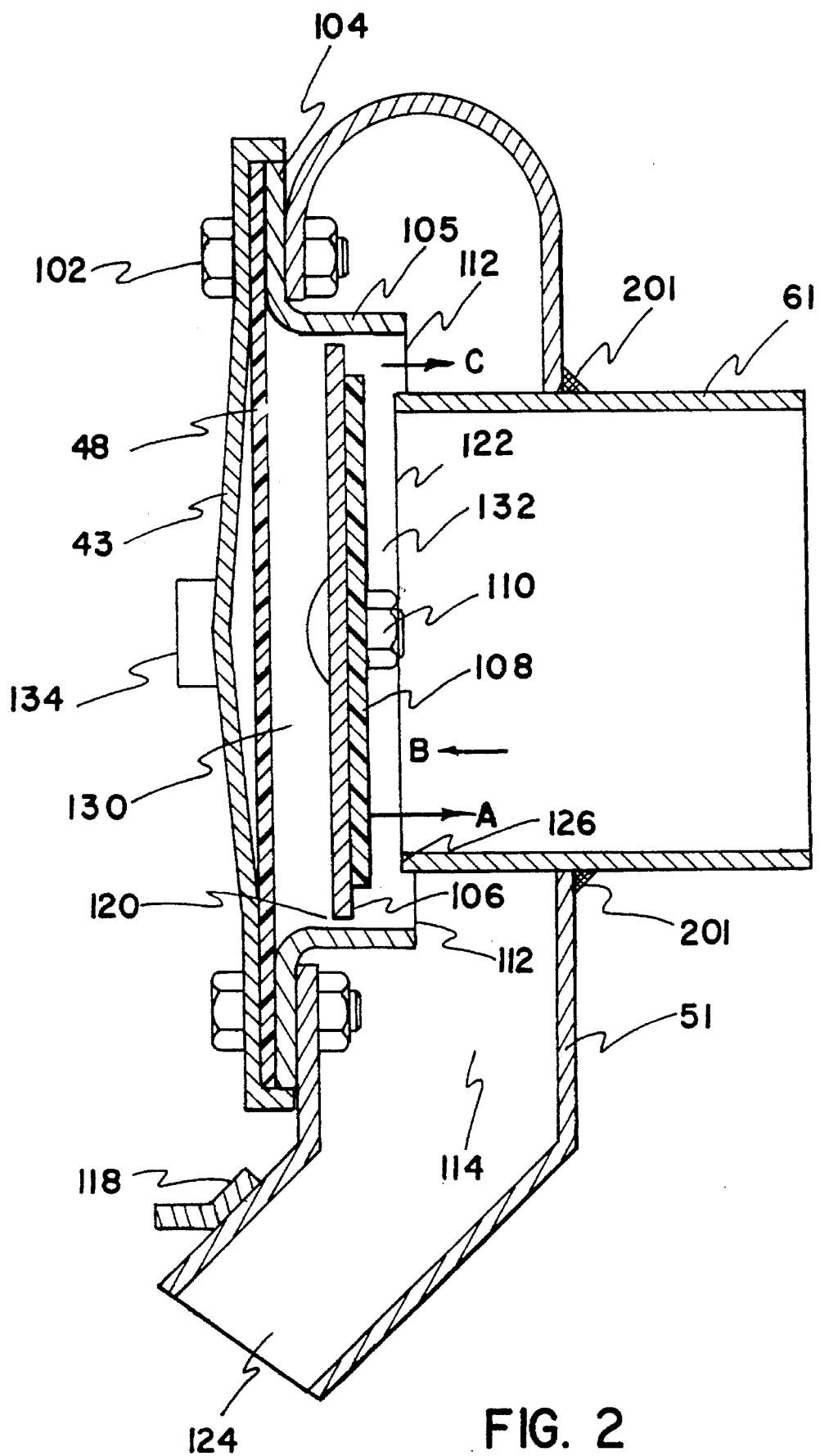
FIG. 2 is a side cross-sectional view along section lines AA of FIG. 3 showing the charging reservoir and nozzle assembly.

FIG. 2 is a side sectional view of charging reservoir 24 and nozzle 51. Flange 104 of charging reservoir 24 is preferably constructed of steel plate. As shown, the circular collar 105 of flange 104 forms the cylinder in which piston 106 travels. Circular collar 105 is preferably stamped into flange 104. Charging head plate 43 holds diaphragm 48 firmly fastened to flange 104. Piston 106 is free to slide within cylinder 128 formed by flange 104. Tolerance 120 is such that piston 106 will easily slide but not so great as to permit piston 106 to hang-up and improperly seat. Tolerance 120 is preferably about 0.125 of inches +/−0.010". Attached to piston 106 by bolt 110 is gasket 108. Gasket 108 is sized to correspond to outlet 122 of the inflation reservoir 11 (shown in FIG. 1). Once piston 106 is moved in direction A, gasket 108 will seal outlet 122 around edge 126. While it is possible to seal portion 130 from portion 132 of charging reservoir 24 with conventional piston sealing techniques such as rings, the use of diaphragm 48 accomplishes the same objective at a much lower cost. By introducing a charge of air via inlet 134 into the charging reservoir 24, diaphragm 48 expands, much as a balloon, and causes piston 106 to move in the direction A.

As noted above, the pressure of the charge of air fed to charging reservoir 24 will always be greater than the pressure within reservoir 11. Thus, gasket 108 will effectively seal a charge of air within reservoir 11.

Nozzle 51 includes plenum 114. Air enters plenum 114 via inlet 112 and exits via nozzle opening 124. Optional position tab 118 may be used to assist positioning the nozzle between the rim and bead of the tire. Nozzle 51 is welded to nipple 61 by fillet 201.

Invention 10 is operated by pushing 28 which releases a small amount of air from charging reservoir 24, that is, the air that is being held within expanded diaphragm 48. This slightly lowers the pressure within that portion of reservoir 24. Quick release valve 40, reacting to the slight drop in pressure, substantially instantaneously releases the charge of air within charging reservoir 24. Thus, piston 106 moves in direction of arrow B which releases gasket 108, permitting the charge of air within inflation reservoir 11 to exit opening 122 and into portion 132 of charging reservoir 24. From there, the charge of air enters inlet 112 in the direction of arrow C to plenum 114. Thus, the charge of air can exit inflation reservoir 11 through nozzle exit 124 as substantially a single pulse of air that is used to seat the bead of tire onto the rim.

Figure 3:
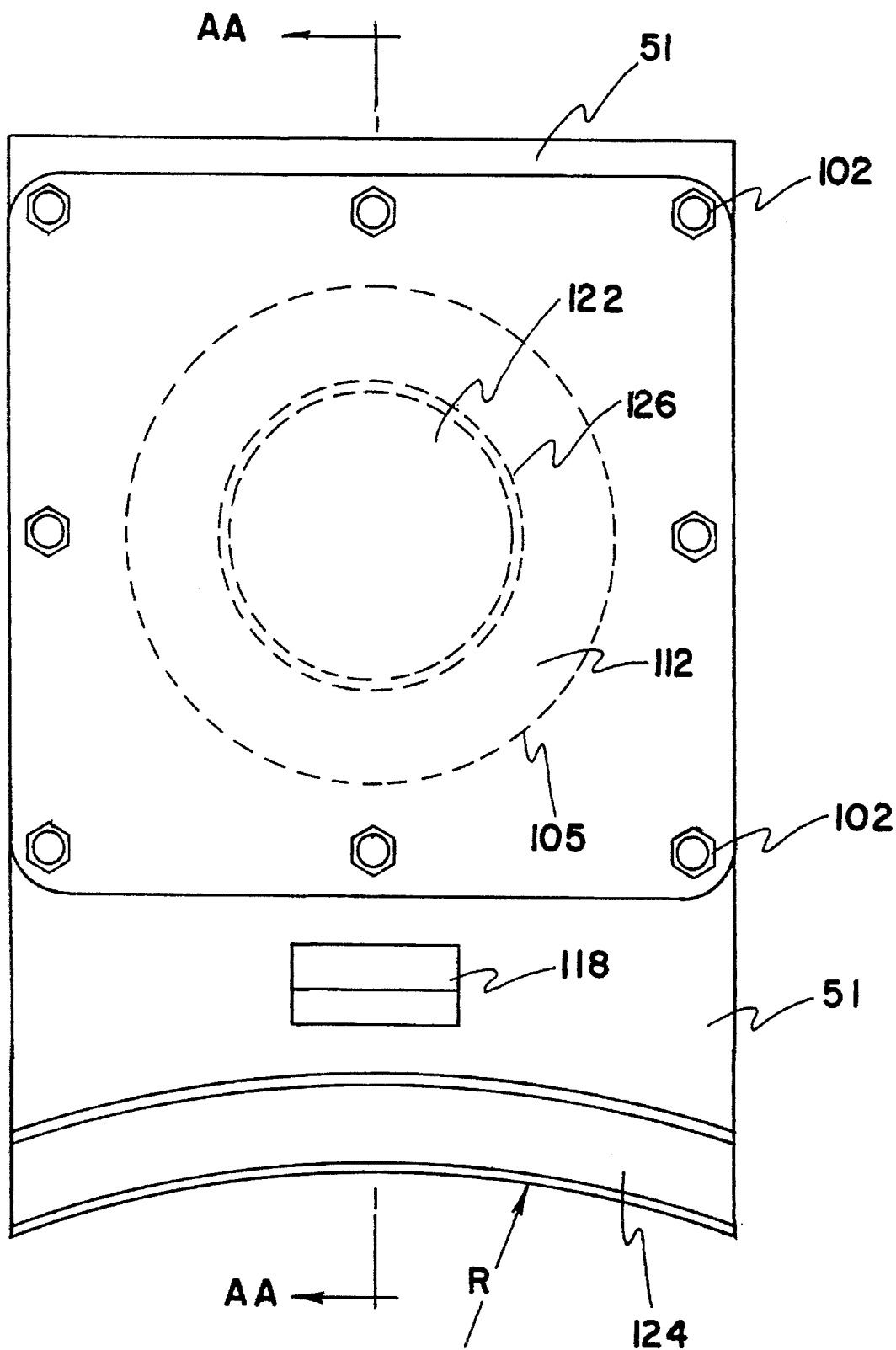
FIG. 3 is a front view of the charging reservoir and nozzle assembly with the quick release valve and spud removed.

FIG. 3 is a front view of charging reservoir 24 and nozzle 51 with quick release valve 40 and coupling 44 removed. In the preferred embodiment, charging head plate 43 and flange 104 are substantially square-shaped. However, this shape is not critical and charging head plate 43 and flange 104 could be round. Note that the nozzle opening 124 of nozzle 51 preferably has radius R to correspond to the radius of the rim and bead of the tire. In this way, the pulse of air is more efficiently directed toward seating the bead of the tire.

Inlet 112 which leads to plenum 114 is formed by collar 105 and edge 126 of nipple 61. By proper selection of the radius of collar 105, the cross-sectional area of inlet 112 can be substantially greater than the cross-sectional area of outlet 122 so that once piston 106 is activated, the charge of air held within inflation reservoir 11 can enter plenum 114 without encountering the resistance that is associated with the use of ball valves or gate valves. Plenum 114 and nozzle exit 124 provide a path that has substantially less resistance to flow than outlet 122 of inflation reservoir 11. Thus, the air charge held within inflation reservoir 11 is released substantially instantaneously as a single pulse of air.

Figures 4A, 4B:
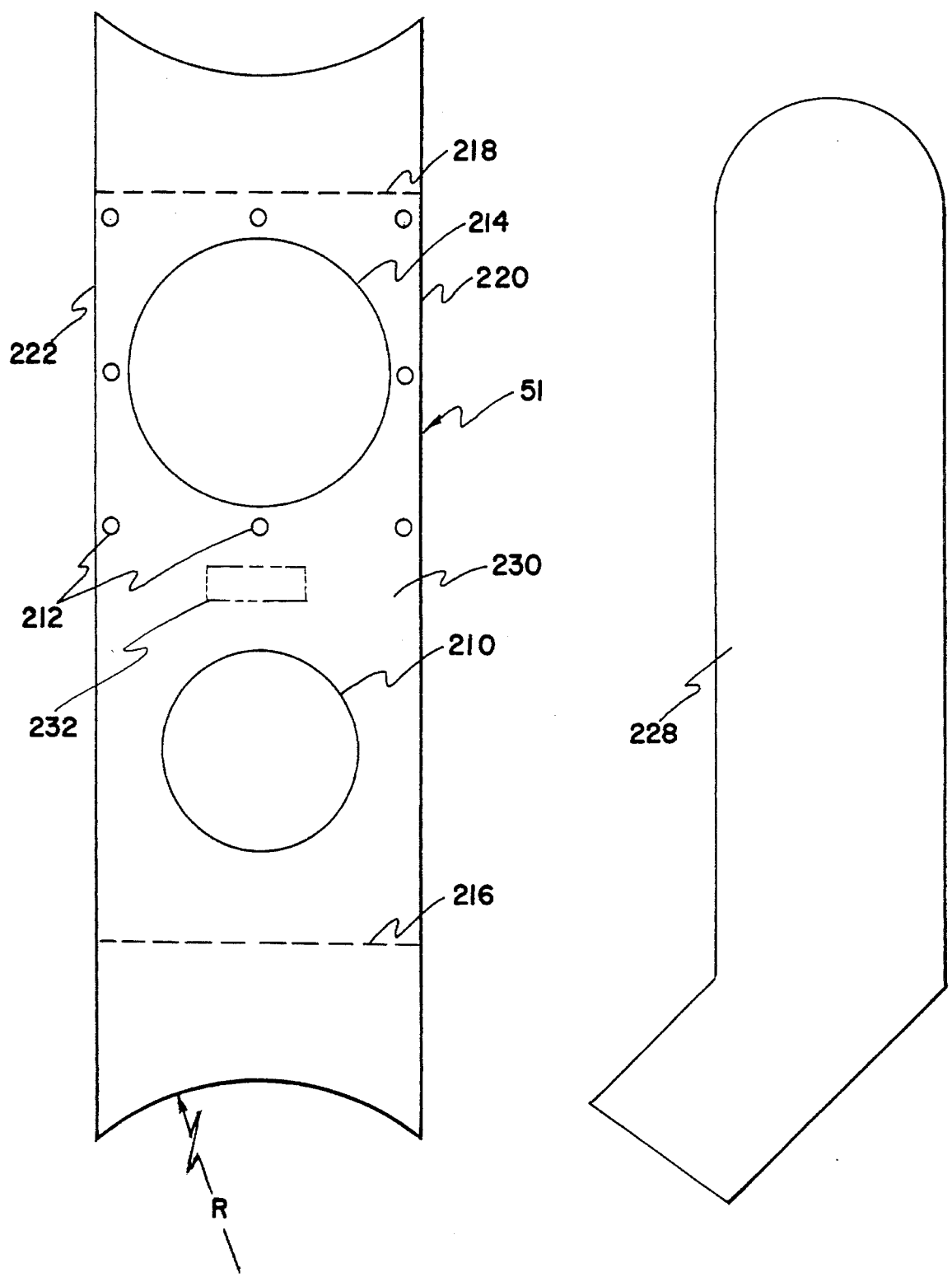
FIG. 4A is a top view of the top/bottom plate used to fabricate the nozzle assembly.
FIG. 4B is a top view of one of the side plates that is welded to the top/bottom plate to complete the nozzle assembly.

FIG. 4A is a top view of the top/bottom plate 230 used to fabricate the nozzle assembly 51. Nozzle assembly 51 is preferably manufactured using steel plate that is stamped in the form of plate 230. Hole 210 is sized so that nipple 61 can fit through. Hole 214 is sized so that collar 105 of flange 104 will fit through. Holes 212 are sized to correspond to bolts 102. Plate 230 is then bent along lines 218,216 and in the region 232 to form the shape shown in FIG. 2. One of the plates 228 shown in FIG. 4B is then welded along edge 220 of plate 230 and another plate 228 is welded along edge 222 to form the completed nozzle assembly 51.

Figure 5:
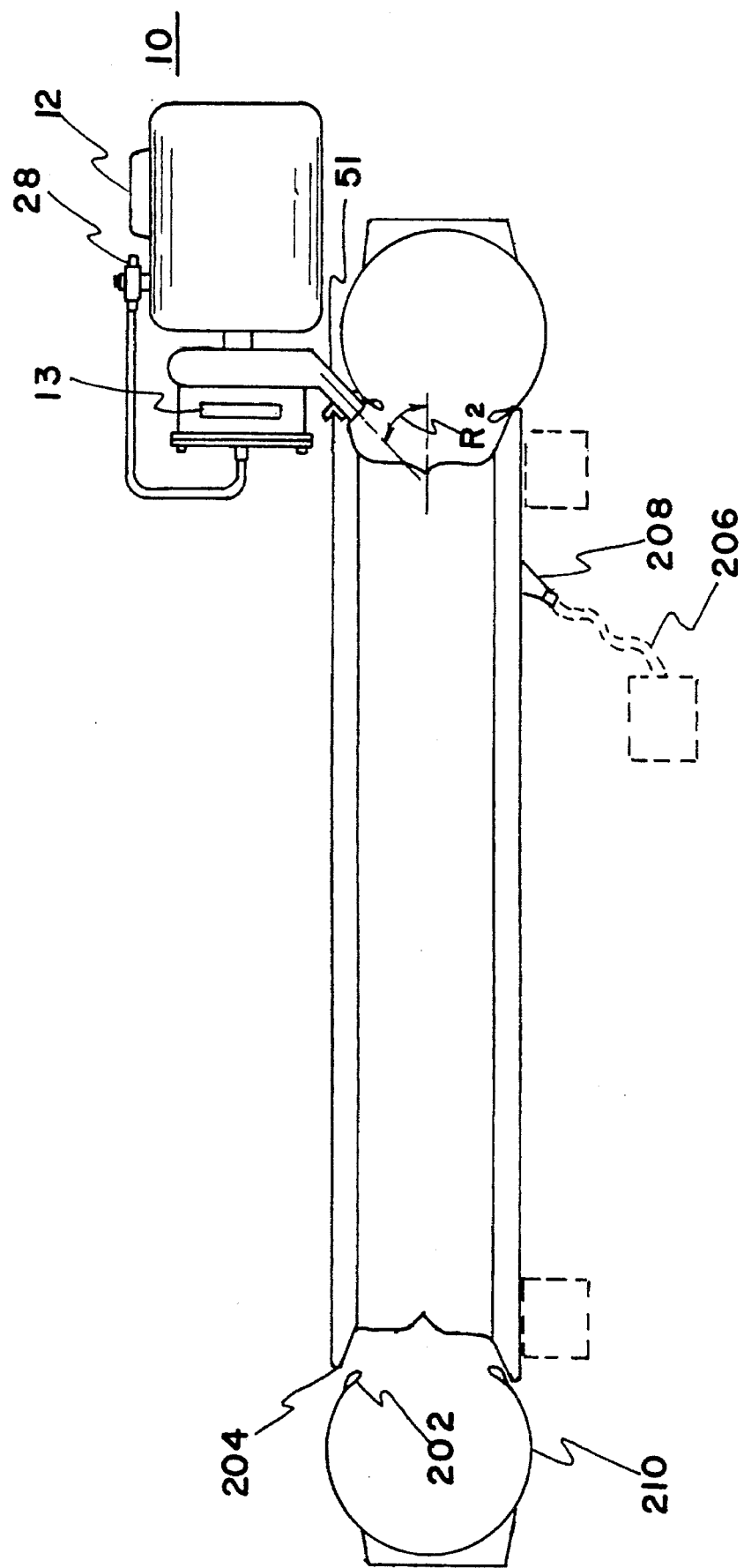
FIG. 5 illustrates the invention being used to inflate a tire.

FIG. 5 illustrates invention 10 being used to inflate tire 210. An operator (not shown) grasps invention 10 by handle 12 if held using one hand or by handle 12 and optional handle 13 if two handed operation is desired. Nozzle 51 is placed between bead 202 of tire 210 and rim 204. Nozzle 51 is positioned at angle R2. Angle R2 is preferably about 45 degrees. However, while this angle will provide improved performance, due to increased efficiency of the invention, it is possible to seat the bead of a tire, even if the angle approaches 90 degrees. Tire 210 is hooked up to a free flowing source of air 206 via valve 208 so that tire 210 can be inflated to pressure, in safety cage, once invention 10 causes bead 202 to seat on rim 204. To successfully seat bead 202 onto rim 204, an operator merely must push button 28 and tire 210 will be substantially instantly seated regardless of the type, size, or manufacturer of truck tire.

Figure 6:
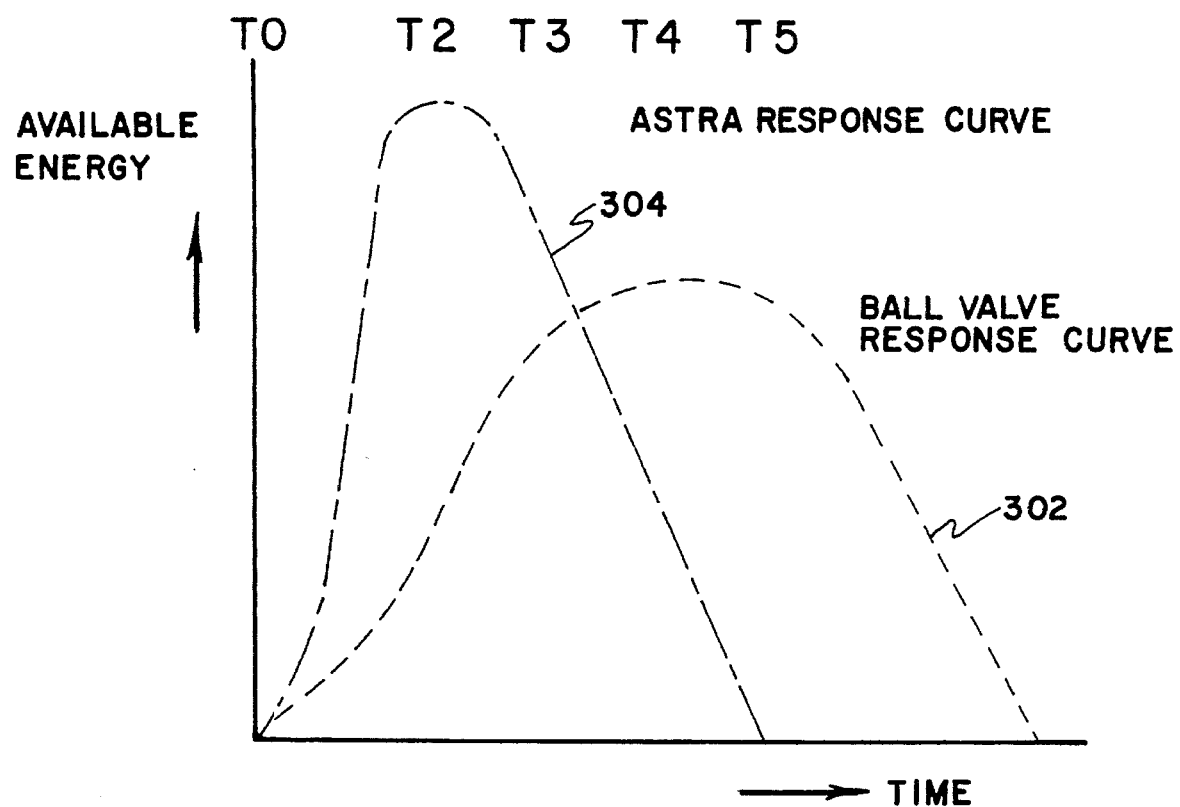
FIG. 6 is a graph showing the improved performance experienced with the invention when compared to a prior art bead seating apparatus.

FIG. 6 is a graph showing the improved performance experienced with invention 10 when compared to a prior art bead seating apparatus. The response curve 302 that is found with a typical ball valve type of bead seating apparatus is sufficient to seat those tires which typically have been less difficult to seat. However, to seat large and more difficult tires, the ball valve type of apparatus had to resort to large tanks, higher pressure or combinations of both. With the substantially improved response curve 304 exhibited by invention 10, the size of the tank and pressures required can be correspondingly reduced yet invention 10 will still seat tires successfully. Also, invention 10 can be shorter in length since the barrel-shaped conduit and the ball valve positioned within the conduit have been eliminated.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for seating the bead of a tubeless tire on a rim comprising:

a) an inflation reservoir for containing a first charge of air having a predetermined volume and pressure, said inflating reservoir having an inlet and outlet;

b) a charging reservoir for containing a second charge of air having a predetermined volume and pressure, said charging reservoir having a charging port, a releasing inlet and an outlet and with the volume of said charging reservoir being much less than the volume of said inflation reservoir;

c) a pressure differential valve disposed between the inlet of said inflating reservoir and the charging port of said charging reservoir, wherein a charge of compressed air introduced into said pressure differential valve causes both said charging reservoir and said inflating reservoir to be substantially simultaneously filled with the pressure in said charging reservoir being at least slightly greater than the pressure in said inflating reservoir;

d) depressurizing means for slightly reducing the pressure within said charging reservoir, said depressurizing means connected to said pressure differential valve;

e) sealing means, separating the outlet of said inflation reservoir from the releasing inlet of said charging reservoir, for releasably holding the charge of air in said inflation reservoir;

f) quick release means, connected to said charging reservoir, for substantially instantaneously releasing the charge of air within said charging reservoir when a slight reduction in the pressure within said charging reservoir is detected;

g) a nozzle having an inlet and an outlet, with the inlet of said nozzle connected to the outlet of said charging reservoir; wherein upon release of the charge of air within said charging reservoir, said sealing means substantially instantaneously releases the charge of air in said inflation reservoir through the outlet of said inflation reservoir into the inflation inlet of said charging reservoir and out the outlet of said charging reservoir and into the inlet of said nozzle, wherein said nozzle delivers the charge that had been stored in said inflation reservoir as a single pneumatic pulse of air between the bead of the tire and the rim to seat the bead of the tire on the rim.

2. The apparatus of claim 1 wherein said sealing means further comprises a piston having a bottom surface and a cross sectional geometry substantially equal to the cross-sectional geometry of said charging reservoir.

3. The apparatus of claim 2 wherein said sealing means further comprises a diaphragm having a cross sectional geometry substantially equal to the cross-sectional geometry of said charging reservoir when said charging reservoir is in a pre-charged state.

4. The apparatus of claim 3 wherein said piston further comprises a seal, attached to the bottom surface of said piston, said seal having a cross sectional geometry at least as great as the cross sectional geometry of the outlet of said inflating reservoir.

5. The apparatus of claim 4 wherein said quick release means further comprises a quick release valve connected to the charging port of said charging reservoir.

6. The apparatus of claim 5 wherein said second charge of air causes said diaphragm to expand thus holding said piston firmly sealed against the outlet of said inflating reservoir.

7. A method for seating the bead of a tubeless tire on a rim comprising the steps of:

a) pressurizing from a source of compressed air a first charge of air within a first predetermined volume at a first pressure;

b) simultaneously pressurizing from said source of compressed air a second charge of air within a second predetermined volume at a second pressure, wherein said first predetermined volume is substantially greater than said second predetermined volume and wherein said second pressure is at least slightly greater than said first pressure;

c) selectively releasing a very small portion of said second charge of air whereby said second pressure is reduced slightly;

d) automatically and substantially instantaneously releasing said second charge of air in response to the slight change in pressure in said second charge;

e) automatically and substantially instantaneously releasing said first charge in response to release of said second charge;

f) orientating said second charge as a single pneumatic pulse such that said single pneumatic pulse is directed between the rim and bead of the tubeless tire; wherein the bead of the tire is seated on the rim.

8. The method of claim 7 in which the released said first charge of air released from said first predetermined volume is at an angle approximately 45 degrees to the plane defined by the bead of the tire.

* * * * *